United States Patent [19]

Richter et al.

[11] Patent Number: 5,535,842

[45] Date of Patent: Jul. 16, 1996

[54] SAFETY ARRANGEMENT FOR COLLISION-RELATED DISCONNECTION OF AN ELECTRICAL ENERGY SOURCE FROM A MOTOR VEHICLE SUPPLY CIRCUIT

[75] Inventors: Bernd Richter, Bokensdorf; Walter Zimdahl, Wolfsburg; Heiko Barske, Gräfelfing; Ingo Rennert, Müden/Aller, all of Germany

[73] Assignee: Volkswagen AG, Wolfsburg, Germany

[21] Appl. No.: 258,707

[22] Filed: Jun. 13, 1994

[30] Foreign Application Priority Data

Mar. 5, 1993 [DE] Germany ........................... 43 14 469.1
Dec. 24, 1993 [DE] Germany ........................... 43 44 639.6

[51] Int. Cl.⁶ .................................................. B60K 28/10
[52] U.S. Cl. ...................... 180/279; 180/271; 200/61.08; 200/61.45 R
[58] Field of Search ...................... 180/279, 271, 180/274; 307/10.1, 97, 99, 116, 10.7; 200/61.44, 61.08, 61.45

[56] References Cited

U.S. PATENT DOCUMENTS 3,277,255 10/1966 Mattsson et al. ..................... 200/61.08
4,224,487 9/1980 Simonsen ............................. 200/61.08
4,417,519 11/1983 Lutz ................................. 200/61.08 X
4,581,504 4/1986 Hamel, Sr. .......................... 200/61.08
5,327,990 7/1994 Busquets ............................. 180/279 X

FOREIGN PATENT DOCUMENTS 0398307 5/1990 European Pat. Off. .
2253366 6/1975 France ................................. 280/279
2327261 1/1975 Germany ............................. 280/279
3744264 7/1989 Germany .
3417328 1/1991 Germany .

Primary Examiner—Christopher P. Ellis
Attorney, Agent, or Firm—Brumbaugh, Graves, Donohue & Raymond

[57] ABSTRACT

A safety arrangement for motor vehicles includes a cable separator responsive to a collision sensor for disconnecting an electrical energy source from a power supply circuit for the vehicle. One form of cable separator includes a knife and a source of propellant energy which drives the knife at least partway through a power cable so as to interrupt the flow of current to the vehicle power circuit.

16 Claims, 3 Drawing Sheets

SAFETY ARRANGEMENT FOR COLLISION-RELATED DISCONNECTION OF AN ELECTRICAL ENERGY SOURCE FROM A MOTOR VEHICLE SUPPLY CIRCUIT

BACKGROUND OF THE INVENTION

This invention relates to safety arrangements for disconnecting a motor vehicle power source from a supply circuit as a result of a collision.

German Offenlegungsschrift No. 34 17 328 discloses collision sensors responsive to deformation of a vehicle body to open a main battery switch so that, immediately after a collision, all appliances connected to the vehicle supply circuit, with the exception of a warning blinker system, are electrically disconnected from the vehicle battery. In this case, the main battery switch is an electromagnetic element which actuates a switch armature in the opening direction when the electromagnet coil is energized.

European Published Application No. 0 398 307 describes a circuit-breaker responsive to separation of switch contacts to interrupt a vehicle power circuit. In German Offenlegungsschrift No. 37 44 264, a power circuit is interrupted by a main battery switch, but the principle of operation is not explained in detail.

Such contact switches in power circuits present problems especially when high currents are involved, as in the electric power circuit of a motor vehicle. For example, starting an internal combustion engine is especially critical. With the high currents involved in starting, contact switches may cause considerable voltage drops and consequent power losses.

SUMMARY OF THE INVENTION

Accordingly, it is an object of the present invention to provide a safety arrangement for disconnecting a power source from a supply circuit of a motor vehicle during a collision which overcomes the disadvantages of the prior art.

This and other objects of the invention are attained by providing a safety arrangement which includes an electrical cable separator responsive to release of stored propellant energy in the event of a collision.

In the electrical cable separator according to the invention, a cable constituting a vehicle supply circuit current conductor is completely unimpaired in its normal condition by the presence of resistive components such as switches. The cable separator is activated only when an emergency is detected by a collision sensor, severing the cable, for example, adjacent to the positive battery terminal. Thus, the cable separator affects the electric power circuit of the vehicle only when it is actually necessary.

To ensure as prompt a reaction time as possible, the cable separator which interrupts the flow of current can be activated by energy from a propellant. The propellant energy may, for example, be from a spring reservoir or from a reservoir filled with a pyrotechnic propellant. Specifically, with the use of pyrotechnology, conventional systems may largely be resorted to, such as those which have, for example, been used for belt-tighteners. The cable separator may thus be manufactured in an economical way. To reduce cost according to one advantageous embodiment of the invention, a vehicle collision may be detected by collision sensors already installed for the purpose of activating other safety devices, such as belt-tighteners, rollover arches or airbags.

The electric power cable may expediently be severed by a very sharp knife having, in a preferred embodiment, a concave cutting edge in order to generate a good notch effect and an approximately constant cutting pressure throughout the entire cutting motion.

Alternatively, the line leading from the source of electrical energy to the vehicle power supply circuit may incorporate a shearable element through which the power supply current normally flows. This shearable element is arranged to be acted upon by propellant energy so that it functions as a cable separator.

In an especially advantageous embodiment, the shearable element is arranged as a sleeve having a circumferential annular groove providing a weak point. An explosive cartridge containing a propellant, to be activated by a signal from the collision sensor, can be inserted into the sleeve. Thus, the shearable element provides a housing for the explosive cartridge. In addition, the shearable element may also serve as a cable connector, for example, to connect a clamp attached to a terminal on the source of electrical energy to a cable contact plate.

The cable separator of the invention does not require significant space in the battery terminal region. Specifically, the proximity of the separator to the terminal clamp assures that the cable is interrupted quite close to the battery terminal so that no additional wires need be added for the cable separator itself. Furthermore, this ensures that, after actuation of the explosive cartridge, no short-circuit can be caused by a loose battery cable. When the cable separator is in the form of a sleeve, another substantial advantage is that, after activation of the explosive cartridge, any propellant emerging from the sleeve is limited to an arc which will be effectively blown out of the sleeve by the propellant when the weak point in the sleeve is ruptured. To dampen the explosive effect, a prestressed rubber block, for example, may be mounted between the contact plate and the pole terminal as a resilient insulator which urges the previously connected parts away from each other after the explosion.

Moreover, an especially advantageous arrangement permits manual restoration of current flow after the cable has been severed, thereby permitting emergency operation of the vehicle. A warning light in the interior of the vehicle may be activated when the power circuit has been manually closed by this arrangement.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
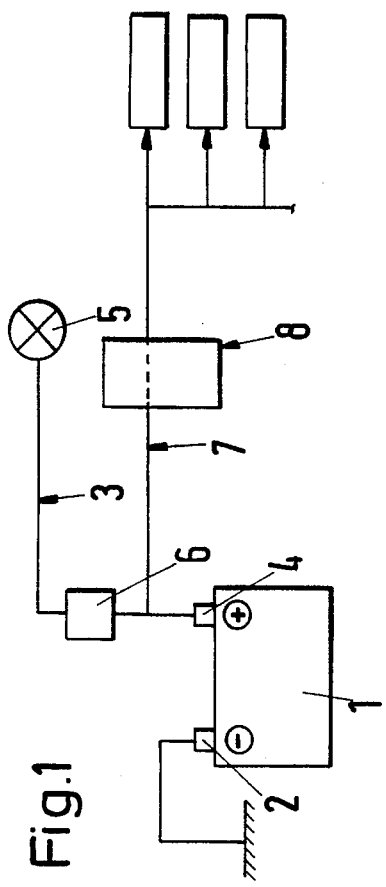
FIG. 1 is a schematic block diagram showing the arrangement of a representative motor vehicle power circuit containing a cable separator arrangement according to the invention.

In all of the drawing figures, like parts have the same reference numeral. In the representative embodiment shown in FIG. 1, a battery 1, constituting a source of electrical energy, has a negative terminal 2 which is grounded. A conductor 3 connects a positive terminal 4 of the battery 1 to a warning blinker system 5, which is schematically shown in FIG. 1. To limit the current in the conductor 3, a resistance 6 is provided. A power cable 7, also connected to the positive terminal 4 of the battery 1, leads through a cable-separating arrangement 8 to various electric appliances in the vehicle, which are not illustrated in detail. They may, for example, include the starter for an internal combustion engine, the vehicle lighting, and various pumps.

Figure 2:
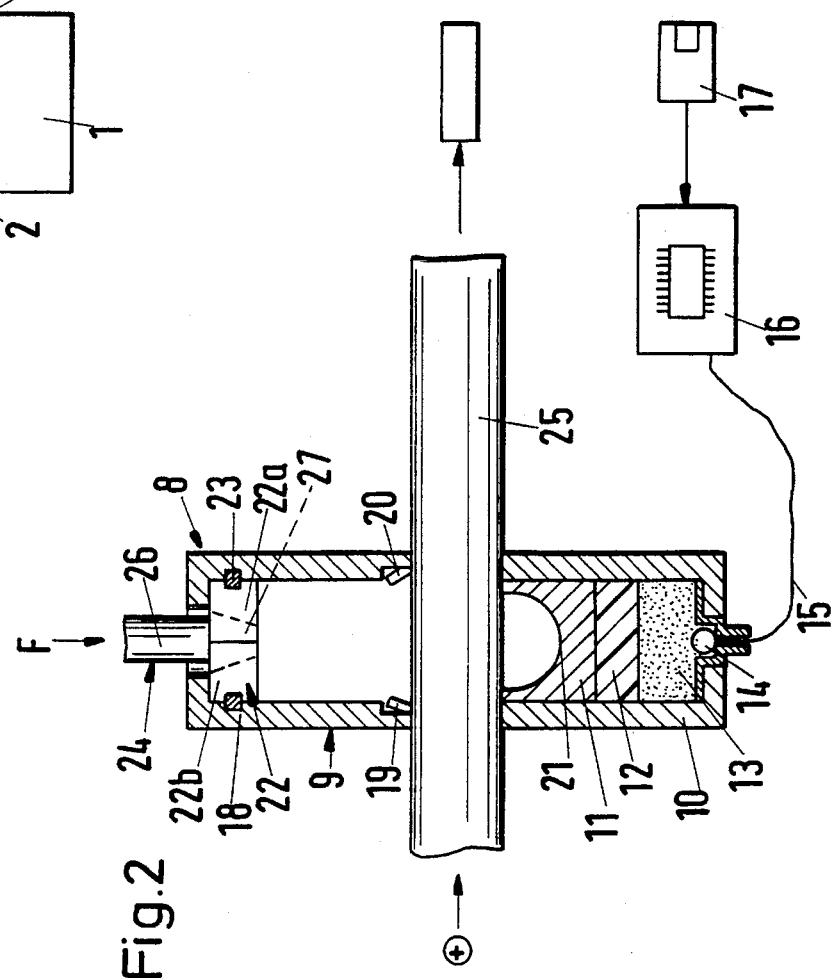
FIG. 2 is a sectional view illustrating a typical embodiment of a cable separator arrangement according to the invention utilizing a pyrotechnically-actuable knife.
Figure 2A:
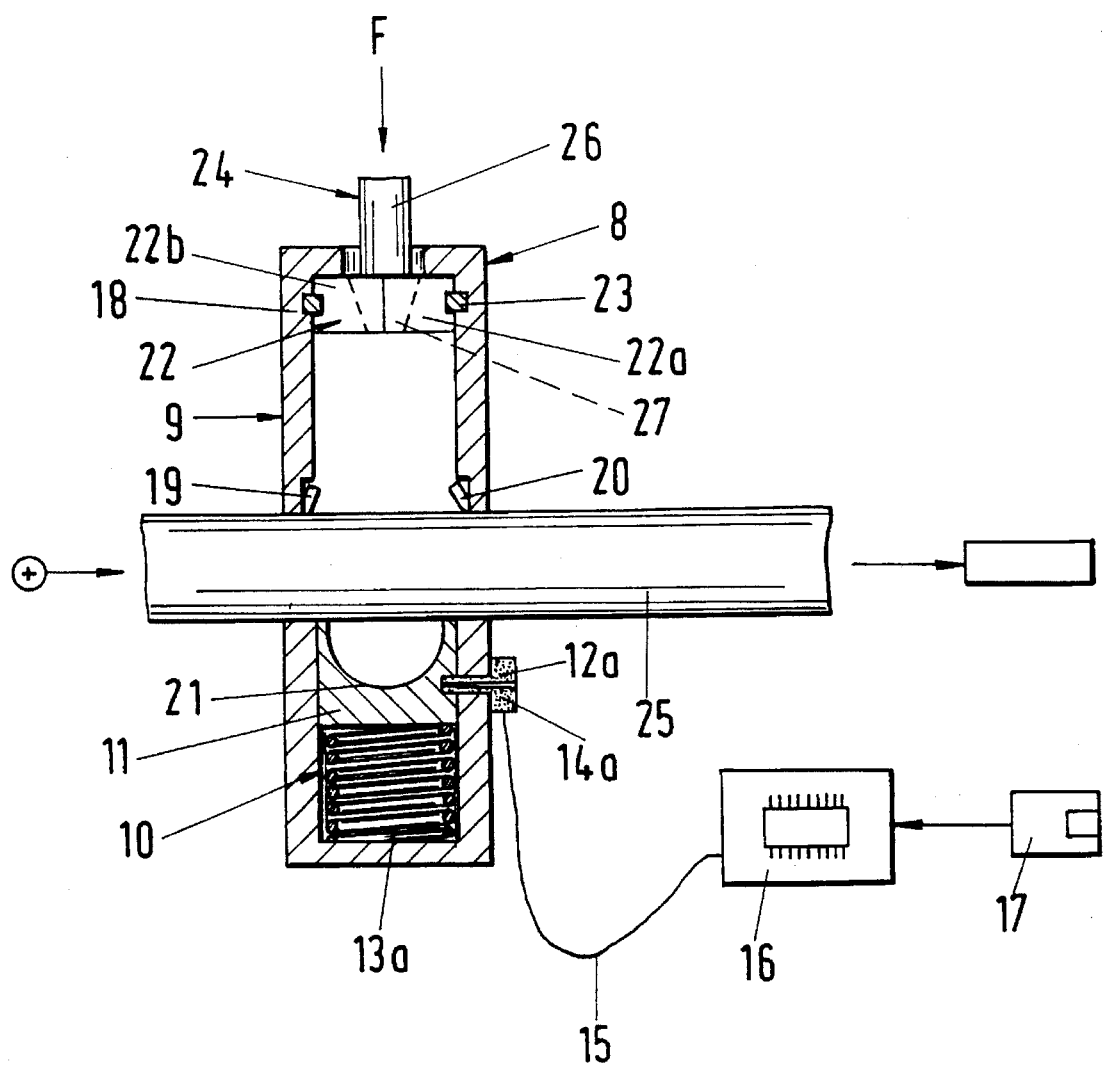
FIG. 2a is a sectional view illustrating an alternative embodiment of a cable separator arrangement according to the invention utilizing a spring-actuable knife.

The representative cable separator arrangement 8 is shown in greater detail in FIG. 2. This cable separator arrangement has a bipartite housing 9 with a longitudinally-displaceable knife 11, capable of being propelled by a pyrotechnic propellant 13 acting through an insulator 12, mounted in one housing section 10. The pyrotechnic propellant 13 can be ignited by a detonator 14 activated by a control unit 16 to which it is connected through a line 15. The pyrotechnic propellant 13 may be replaced by a spring 13a, as illustrated in FIG. 2a, with the knife 11 being retained by a plug 12a arranged to be destroyed by a detonator 14a in response to a pulse from the line 15 to release the knife 11, which is then propelled by the spring 13a to sever the cable 25. The control unit 16 receives signals from a collision sensor system 17 which responds, for example, to deformations, abnormal movements or abrupt decelerations of the vehicle.

In an upper section 18 of the housing, two flexible projections 19 and 20 can be pressed outward from their inwardly-directed normal position by upward motion of the knife 11 following propellant activation. As soon as the knife 11 has passed the upper ends of the projections 19 and 20, the projections swing inwardly again, thus preventing the knife from dropping back. The upward motion of the knife 11, which is formed with a concave edge 21, is limited by a shock absorber 22 consisting of two conductive parts 22a and 22b, preferably made of copper, retained in the upper section 18 of the housing by an expansion ring 23.

The shock absorber 22 is engaged by a reset device 24 to permit emergency reconnection of a current-carrying cable 25 after it has been severed by the knife 11. For this purpose, a force F, generated, for example, by an impact or by rotation of a threaded coupling, is exerted on a plunger 26, which in turn acts on a wedge 27 mounted in the shock absorber 22. The strength of the expansion ring 23 is selected so that the shock absorber 22 can be moved downward by the wedge 27 with a relatively small force. The same applies to the flexible projections 19 and 20, which will also bend inwardly with little effort and permit the knife 11 to be returned to the initial position shown in the drawing. The cable 25, which will be retained by the housing sections 10 and 18 even after severance, can again carry current if the conductive parts 22a and 22b of the shock absorber are forced against the cut ends of the cable 25 by wedge action.

Downward displacement of the shock absorber 22 may be detected by a switch, not illustrated in the drawing, to indicate to the control unit 16 that the reset device 24 has been operated. The control unit 16 may then, for example, permit an internal combustion engine installed in the vehicle to be started and available for use with a limited power capacity only. It is also possible to provide gear operation barriers so that emergency operation of a vehicle with an automatic transmission may be effected, for example, at only the two lowest speeds. In addition or alternatively, a warning light in the interior of the vehicle may be activated by the reset device 24.

Figure 3:
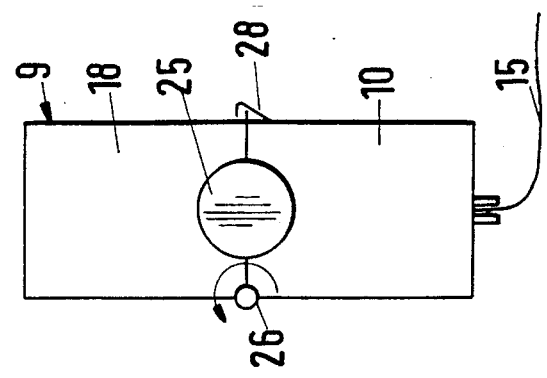
FIG. 3 is a side view of the cable separator arrangement shown in FIG. 2.

FIG. 3 illustrates a hinge 26 which permits the housing sections 10 and 18 to be pivoted with respect to each other. A snap closure 28, shown schematically in the drawing, is arranged to clamp the housing parts 10 and 18 against the cable 25. A housing 9 arranged in this way permits convenient installation of the cable separator arrangement 8 according to the invention in vehicles already in use. Thus, such a cable separator arrangement may advantageously be offered as an update kit. The housing 9 may, if desired, be hermetically sealed so that, if gasoline leaks as a result of a collision, the part of the cable being severed is not exposed to any combustible liquids or vapors, thereby preventing sparks that may occur upon severance from having any effect.

To provide as compact a construction as possible in the above-described embodiment, the travel of the knife 11 may be limited so that only a portion of the cross-section of the cable is severed. The remainder of the partially-severed cable will then melt down in the manner of a fuse as a result of high current.

Figure 4:
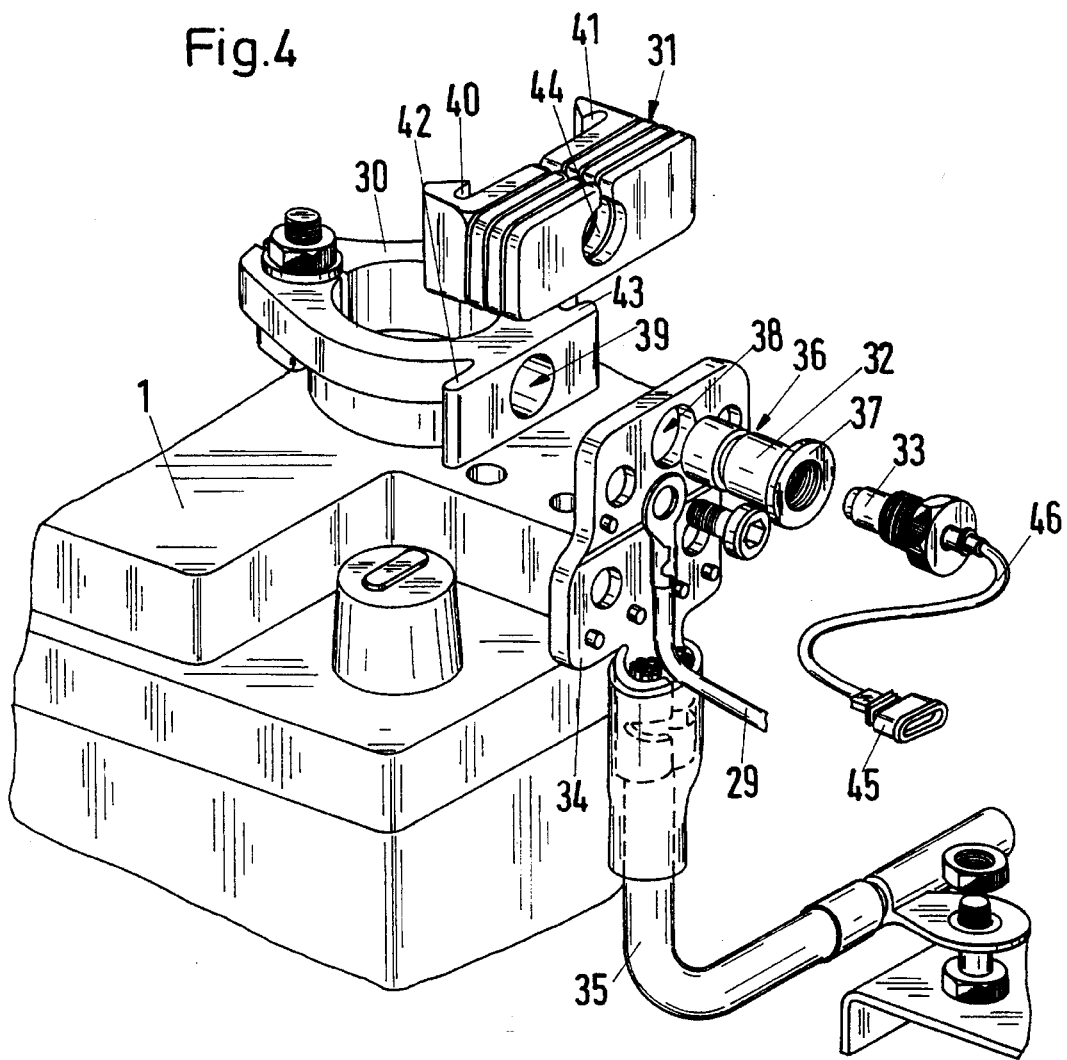
FIG. 4 illustrates another embodiment of a cable separator arrangement according to the invention.

In a further typical embodiment of the invention shown in FIG. 4, a battery 1 is connectable by a cable separator arrangement to a cable 29 which supplies power to a vehicle power circuit. The cable separator arrangement includes a terminal clamp 30, a rubber pad assembly 31, a sleeve 32 arranged to be severed by an explosive cartridge 33 inserted therein, and a contact plate 34 to which the cable 29 is connected. In addition to the cable 29, a ground line 35 is also connected to the contact plate. To provide a weak point, the sleeve 32 has an encircling annular groove 36 which is spaced from an encircling shoulder 37 by a distance slightly greater than the thickness of the contact plate 34.

When the components of the cable separator are assembled, the sleeve 32 passes through a first aperture 38 in the contact plate and into a second aperture 39 in the terminal clamp 30 so as to connect the cable to the terminal. The connection of the terminal clamp 30, the contact plate 34 and the sleeve 32 may in principle be mechanical, frictional or bonded. It has been found especially advantageous to solder the sleeve 32 both to the terminal clamp 30 and to the contact plate 34. The rubber pad 31, made of a resilient insulating material, is formed with retaining grooves 40 and 41 arranged to receive two flanges 42 and 43 formed in the terminal clamp 30 to provide a mechanical connection. The rubber pad 31 also has an aperture 44 through which the sleeve 32 passes when the cable separator is assembled. The connection between the terminal clamp 30 and the contact plate 34 is frictional since the resilient rubber pad is compressed so that it is prestressed when it is installed between the terminal clamp and the contact plate.

If the cartridge 33 is activated, for example, by signals from a collision sensor 45 transmitted through a signal line 46, a pressure is generated inside the sleeve 32 which is high enough that the sleeve will be severed at the weak point 36. Any arc caused upon fracture is effectively blown out by the emerging propellant. The prestressed rubber pad 31 then expands and thus dependably establishes a spatial separation of the contact plate 34 from the terminal clamp 30. Since the rubber pad 31 is an insulator, any relapsing motion of the contact plate 34 toward the terminal clamp cannot reestablish a conductive connection with the battery 1.

The invention is not limited to the embodiments illustrated in the drawings. It is also possible, for example, to provide a terminal clamp 30 and a contact plate 34 formed in one piece in which the clamp and plate are separated from each other by separable weak points. The weak points may be formed by intentional weakening of a unitary piece of material or by spot welds between two pieces of material, and they may be acted upon in a controlled manner by an explosive cartridge as described previously.

The ignition time of the explosive cartridge 33 is determined by a control unit selected so that the battery 1 will not be separated from the power circuit until after complete activation of safety devices in the vehicle, such as airbags and belt-tighteners. This requirement is especially important in view of the rapidity of circuit interruption which is attainable with the explosive cartridge. Since the cable-separating arrangement according to the invention requires no additional wiring and depends to a large extent on standard commercial parts, an effective separation of the battery 1 from the power circuit after an accident is possible at very low cost. It should also be apparent that, in normal operation of the vehicle, the sleeve 32 does not cause any voltage drop, as contact switches commonly do.

Although the invention has been described herein with reference to specific embodiments, many modifications and variations therein will readily occur to those skilled in the art. Accordingly, all such variations and modifications are included within the intended scope of the invention.

We claim:

1. A safety arrangement for a motor vehicle comprising a source of electrical energy, a motor vehicle power circuit, a continuous integral conductive member connecting the source of electrical energy to the motor vehicle power circuit, separator means actuatable by release of stored propellant energy for destroying the integrity of the continuous integral conductive member to at least partially separate the source of electrical energy from the motor vehicle power circuit, and collision-sensing means for actuating the separator means in response to sensing of a vehicle collision.

2. A safety arrangement according to claim 1 including spring means providing the propellant energy for actuating the separator means.

3. A safety arrangement according to claim 1 comprising pyrotechnic means providing the propellant energy for actuating the separator means.

4. A safety arrangement according to claim 1 wherein the separator means comprises a knife.

5. A safety arrangement according to claim 4 wherein the knife has a concave edge.

6. A safety arrangement according to claim 1 wherein the separator means comprises a housing capable of being clamped onto the continuous integral conducting member and a snap closure for retaining the housing clamped onto the continuous integral conducting member.

7. A safety arrangement according to claim 1 wherein the separator means includes reset means for restoring the connection between the motor vehicle power circuit and the source of electrical energy.

8. A safety arrangement according to claim 7 including motor vehicle control means responsive to the reset means for limiting operation of the motor vehicle to an emergency operating mode.

9. A safety arrangement according to claim 1 wherein the collision-sensing means is arranged to actuate at least one other safety device in the motor vehicle.

10. A safety arrangement according to claim 1 wherein the separator means comprises a shear element in the continuous integral conductive member capable of destroying the integrity of the continuous integral conductive member in response to propellant energy.

11. A safety arrangement according to claim 10 wherein the shear element is a weak point in the continuous integral conductive member.

12. A safety arrangement according to claim 10 wherein the continuous integral conductive member is a sleeve and the shear element is an at least partly encircling annular groove in the sleeve.

13. A safety arrangement according to claim 12 wherein the sleeve is engaged by a cartridge containing a propellant to provide the propellant energy.

14. A safety arrangement according to claim 13 wherein the cartridge is arranged to threadedly engage the sleeve.

15. A safety arrangement according to claim 12 wherein the sleeve constitutes a pin-like connector connecting a terminal attached to the source of energy and a contact plate connected to a cable.

16. A safety arrangement according to claim 15 including a prestressed resilient member between the terminal and the contact plate.

* * * * *

UNITED STATES PATENT AND TRADEMARK OFFICE
CERTIFICATE OF CORRECTION

PATENT NO. : 5,535,842
DATED : July 16, 1996
INVENTOR(S) : Richter et al.

It is certified that error appears in the above-indentified patent and that said Letters Patent is hereby corrected as shown below:

On the title page, item [30], omit "Mar. 5, 1993 [DE] Germany....... 43 14 469.1".

Signed and Sealed this

Fifth Day of November, 1996

Attest:

BRUCE LEHMAN

*Attesting Officer*     *Commissioner of Patents and Trademarks*